(12) United States Patent
Bury et al.

(10) Patent No.: US 9,212,095 B2
(45) Date of Patent: Dec. 15, 2015

(54) USE OF HYPERBRANCHED POLYETHER SURFACTANT IN CEMENTITIOUS SYSTEMS

(75) Inventors: Jeffrey R. Bury, Auburn Township, OH (US); Thomas M. Vickers, Jr., Concord Township, OH (US)

(73) Assignee: Construction Research & Technology, GmbH, Trostberg (DE)

( * ) Notice: Subject to any disclaimer, the term of this patent is extended or adjusted under 35 U.S.C. 154(b) by 0 days.

(21) Appl. No.: 13/400,198

(22) Filed: Feb. 20, 2012

(65) Prior Publication Data

US 2012/0214901 A1    Aug. 23, 2012

Related U.S. Application Data

(60) Provisional application No. 61/444,855, filed on Feb. 21, 2011.

(51) Int. Cl.
| | | |
|---|---|---|
| C08K 3/00 | (2006.01) | |
| C04B 24/32 | (2006.01) | |
| C04B 28/02 | (2006.01) | |
| C04B 40/00 | (2006.01) | |
| C04B 103/40 | (2006.01) | |

(52) U.S. Cl.
CPC ............... *C04B 24/32* (2013.01); *C04B 28/02* (2013.01); *C04B 40/0039* (2013.01); *C04B 2103/40* (2013.01)

(58) Field of Classification Search
CPC ...... C04B 24/32; C04B 28/02; C04B 40/0039
USPC ........................................................... 524/5
See application file for complete search history.

(56) References Cited

U.S. PATENT DOCUMENTS

| | | | |
|---|---|---|---|
| 5,827,453 A | 10/1998 | Gross et al. | |
| 6,110,977 A | 8/2000 | Gross et al. | |
| 6,133,347 A | 10/2000 | Vickers, Jr. et al. | |
| 6,172,123 B1 | 1/2001 | Lindert et al. | |
| 6,258,162 B1 | 7/2001 | Kawakami et al. | |
| 6,350,787 B1 | 2/2002 | Wiggins et al. | |
| 6,358,310 B1 | 3/2002 | Berke et al. | |
| 6,387,962 B1 | 5/2002 | Wiggins et al. | |
| 6,451,881 B1 | 9/2002 | Vickers, Jr. et al. | |
| 6,465,605 B2 | 10/2002 | Breindel et al. | |
| 6,472,440 B2 | 10/2002 | Gross et al. | |
| 6,492,461 B1 | 12/2002 | Vickers, Jr. et al. | |
| 6,512,016 B2 | 1/2003 | Khan et al. | |
| 6,569,924 B2 | 5/2003 | Shendy et al. | |
| 6,572,691 B2 | 6/2003 | Brown et al. | |
| 6,576,736 B2 | 6/2003 | Wiggins et al. | |
| 6,583,185 B2 | 6/2003 | Wiggins et al. | |
| 6,861,459 B2 | 3/2005 | Vickers et al. | |
| 6,875,801 B2* | 4/2005 | Shendy et al. | 524/5 |
| 6,908,955 B2 | 6/2005 | Porsch et al. | |
| 6,960,304 B1 | 11/2005 | Brown et al. | |
| 7,247,606 B2 | 7/2007 | Gross et al. | |
| 7,308,938 B1 | 12/2007 | Chatterji et al. | |
| 8,088,842 B2* | 1/2012 | Shendy et al. | 524/5 |
| 2003/0187101 A1* | 10/2003 | Shendy et al. | 524/2 |
| 2005/0257720 A1* | 11/2005 | Shendy et al. | 106/692 |
| 2011/0160393 A1 | 6/2011 | Sakamoto et al. | |

FOREIGN PATENT DOCUMENTS

| | | |
|---|---|---|
| DE | 10 2006 011 813 A1 | 9/2007 |
| JP | 2010-65146 | 3/2010 |
| JP | 2010-222195 | 10/2010 |
| WO | WO 2004/056445 A1 | 7/2004 |
| WO | WO 2010/094701 A1 | 8/2010 |

OTHER PUBLICATIONS

Machine translation of JP 2010-065146. March 2010.*
Fink, Johannes Karl (2005). Reactive Polymers Fundamentals and Applications—A Concise Guide to Industrial Polymers. William Andrew Publishing/Plastics Design Library. pp. 139-240.*
FoamStar A10 Data Sheet. Sep. 3, 2009.*
International Search Report, Form PCT/ISA/210, mailed Jun. 26, 2012, for corresponding PCT International Patent Application No. PCT/EP2012/052888.
Written Opinion, Form PCT/ISA/237, mailed Jun. 26, 2012, for corresponding PCT International Patent Application No. PCT/EP2012/052888.

* cited by examiner

*Primary Examiner* — John Uselding
(74) *Attorney, Agent, or Firm* — Curatola Sidoti Co., LPA; Joseph G. Curatolo; Salvatore A. Sidoti

(57) ABSTRACT

A cementitious composition containing hydraulic cement, water, and a hyper-branched polyether surfactant. An aqueous admixture composition for cementitious compositions including a hyper-branched polyether surfactant, optionally a dispersant, optionally an additional surfactant or defoamer, and optionally a stabilizing agent. A method of making a cementitious composition including mixing cementitious material, water, a hyper-branched polyether surfactant, optionally a dispersant for cementitious compositions, optionally an additional surfactant or defoamer, and optionally a stabilizing agent.

23 Claims, No Drawings

USE OF HYPERBRANCHED POLYETHER SURFACTANT IN CEMENTITIOUS SYSTEMS

The present application claims the benefit of the filing date of U.S. Provisional Patent Application 61/444,855, filed Feb. 21, 2011, incorporated by reference herein.

Hydraulic cements, such as Portland cement, are used to prepare structural formations. Hydraulic cements may be mixed with water and small aggregate to form mortars. Concrete is a mortar which additionally includes large aggregate.

When working with hydraulic cements, it is desired to increase the slump properties of the initially formed hydraulic cement composition to aid in placement of the composition and to extend the period of flowability in order to provide adequate working time to finish the placement of the cement composition.

Admixtures may be added to hydraulic cement to increase the slump. Additionally, admixtures may be added to reduce the amount of water required to hydrate the cement and to produce flowable cementitious compositions. The reduced water content increases the strength of the resulting hydraulic cement structure.

One admixture for increasing the flowability of the cementitious composition and reducing the water content includes a polycarboxylate dispersant. Certain polycarboxylate dispersants are polymers having a carbon backbone with pendant side chains, wherein at least a portion of the side chains are attached to the backbone through a carboxyl group or an ether group. Polymers containing an ether group linkage are sometimes referred to as polycarboxylate ether dispersants. In some embodiments, side chains may be attached to the backbone by amide or imide linkages. Polycarboxylate dispersants are very effective at dispersing and reducing the water content in hydraulic cements.

Polycarboxylate dispersants may entrain air in the cementitious composition during mixing. While some entrained air may be desired for particular applications, such as providing freeze-thaw durability to the cement, an excess of entrained air is detrimental to the compressive strength of the resulting hydraulic cement formation.

The use of cement dispersants based on polycarboxylate chemistries, sometimes includes the addition of an air detraining agent to minimize the amount of air entrained in a cementitious composition for non-air entrained applications. The use of air detraining agents in a cementitious composition, however, can make it difficult to obtain the proper air content with normal dosages of air entraining agents, or can result in air contents that increase with the mix time of the cementitious composition.

Control of air contents in cementitious compositions has been a constant issue in the concrete industry. Generally in the construction industry, non-air entrained cementitious compositions having an air content of less than 3% is desired. Air entraining admixtures are sometimes used to provide purposeful air contents of 5-8% which improves the freeze-thaw durability of the cementitious mixture. When this is the case, it is desirable to be able to adjust the air content by changing the air entrainer dosage and to have the resulting air remain stable over time.

To overcome the excess entraining of air in cementitious compositions, defoamers have been added to the cementitious mix to reduce the air content to a desired level. Defoamers may be included in the polycarboxylate admixture.

There are additional entrained air issues that arise in cementitious mixtures. Highly fluid concrete mixtures such as self-consolidating concrete (SCC) mixtures may have significant amounts of entrapped air that migrates to the surface once the concrete mixture is placed. The severity of this bubbling or the duration of time that bubbles migrate to and remain on the surface during the initial structure build (thixotropic setting) common for these types of concrete mixtures, once placed, can result in surface defects left in the hardened surface.

We have demonstrated that the use of a hyper-branched polyether surfactant in a cementitious composition can effectively regulate overall air contents in cementitious systems, such as by defoaming and can reduce surface defects that occur in highly fluid mixtures such as SCC mixtures. The subject hyper-branched polyether surfactant has been shown to provide air control or air regulation in non-air-entrained cementitious systems, and may provide control of air in air-entrained cementitious systems. In certain embodiments, the hyper-branched polyether surfactant may comprise a star polymer or a dendritic polymer.

A star polymer molecule is a branched polymer molecule in which a single branch point gives rise to multiple linear chains or arms. The star polymers are small core molecules with branches radiating from the core. In the hyper-branched surfactant, the core may be generally hydrophilic and the chains may be hydrophobic. Starburst or dendritic polymers are a special class of star polymer in which the branches are multifunctional, leading to further branching with polymer growth.

The hyper-branched polyether surfactant may include branched compounds or mixtures of compounds which are reaction products of components comprising at least one compound a) of formula I:

$$R^1(X)_3$$ 

wherein each X group is a halogen atom or one X group is a halogen atom and two X groups represent an epoxy oxygen atom, which is attached to two adjacent carbon atoms in the $R^1$ group to form an epoxy group, and $R^1$ is an alkanetriyl group containing from 3 to 10 carbon atoms; and at least one compound b) of formula IIa:

$$R^2(OA)nY$$ 

wherein $R^2$ is an organic group containing from 1 to 36 carbon atoms, n is a number of from 0 to 200, in some embodiments 1 to 100, and in further embodiments 2 to 20, Y is —OH, —NHR' wherein R' is hydrogen or a $C_1$-$C_4$ alkyl group, or —SH, and each OA group is independently an ethyleneoxy (EO), 1,2-propyleneoxy (PO), or 1,2-butyleneoxy (BO) group, provided that when Y is an amine group, n is at least 1; or of formula IIb:

$$R^2Z(AO)nY^1$$ 

wherein $R^2$ is hydrogen or as defined above, Z is —O—, —S—, or —NR$^4$—, where $R^4$ is hydrogen or a $C_{1\text{-}18}$ alkyl group, AO and n are as defined above and $Y^1$ is H, or $Y^1$ is mercapto, amino, or $C_{1\text{-}6}$ alkylamino in place of a terminal —OH group (in which case n is at least 1).

In some embodiments component b) is a mixture of at least two compounds of formula II wherein the $R^2$ group in the first compound b') is an aliphatic group, such as an alkyl group, containing from 1 to 8 carbon atoms, or a phenol or styrenated phenol group, and the $R^2$ group in the second compound b") is an aliphatic group, such as an alkyl group, containing from 9 to 36 carbon atoms, and said second compound b") is present in from about 0.001 to about 50 mole %, optionally from 10 to 30 mole %, based on the moles of the first compound b'.

The mole ratio of compound a) to compound b) may be from about 0.1:1 to about 5:1, in certain embodiments, from about 0.6:1 to about 2:1, in some embodiments from about 1:1 to about 2:1, and in further embodiments from about 0.8:1 to about 1.5:1.

In certain specific embodiments the hyper-branched polyether surfactant may be a product of the reaction of epichlorohydrin or another epihalohydrin (i.e. containing chlorine, bromine, iodine, or mixtures thereof) and a compound or compounds having the formula III:

$$R^3(EO)n(PO)m(BO)pOH$$

wherein $R^3$ is a substituted or unsubstituted, saturated or unsaturated aliphatic moiety having from 4 to 22 carbon atoms; a substituted alkyl or alkenyl group having from 4 to 22 carbon atoms wherein n is a number from 0 to 50. m is a number from 0 to 50 and p is a number from 0 to 50; and wherein the mole ratio of epichlorohydrin or epihalohydrin to (III) is from about 0.6:1 to about 2:1 and in some embodiments from about 0.8:1 to about 2:1.

With regard to the alkoxylates of formula III, $R^3$ can be any substituted or unsubstituted, saturated or unsaturated organic group having from 1 to 36 carbon atoms, typically an aliphatic moiety having from 4 to 22 carbon atoms. Thus $R^3$ can be a linear or branched alkyl group, a linear or branched alkenyl or alkynyl group, a saturated carbocyclic moiety, an unsaturated carbocyclic moiety having one or more multiple bonds, a saturated heterocyclic moiety, an unsaturated heterocyclic moiety having one or more multiple bonds, a substituted linear or branched alkyl group, a substituted linear or branched alkenyl or alkynyl group, a substituted saturated carbocyclic moiety, a substituted unsaturated carbocyclic moiety having one or more multiple bonds, a substituted saturated heterocyclic moiety, a substituted unsaturated heterocyclic moiety having one or more multiple bonds. Examples of the above include but are not limited to an alkyl group having from 4 to 22 carbon atoms, an alkenyl group having from 4 to 22 carbon atoms, or an alkynyl group having from 4 to 22 carbon atoms. $R^3$ may be an alkyl group having from 4 to 12 carbon atoms, and in some embodiments an alkyl group having from 8 to 10 carbon atoms. $R^3$ can also be an aryl group having from 6 to about 22 carbon atoms, or an arenyl group having from 7 to about 22 carbon atoms. Arenyl groups are alkyl-substituted aromatic radicals having a free valence at an alkyl carbon atom such as a benzylic group.

Substituted groups may comprise single or multiple substituents such as one or more halogen substituents, for example, Cl, F, I, and/or Br; a sulfur functionality such as a mercaptan or thio group, a nitrogen functionality such as an amine or amide functionality; an alcohol functionality, a silicon functionality, e.g., a siloxane; an ether functionality, e.g. a $C_1$-$C_6$ alkoxy group; or any combination thereof.

The degree of ethoxylation may be from 2 to about 50, typically being from about 4 to about 50, while the degree of propoxylation may vary from 0 to 50. The degree of propoxylation (or butoxylation) will be determined by the desired degree of water solubility or miscibility. The water solubility or miscibility will ultimately be determined by such factors as the number of carbon atoms in $R_3$, and/or the relative amounts EO to PO (and/or BO). The water solubility or miscibility of the surfactant and the interrelationships between the number of carbon atoms in $R^3$ and the relative amounts of EO and PO (and/or BO) will be readily determinable by one of ordinary skill in the art.

Illustrative examples of compounds of formula III include but are not limited to decyl alcohol ethoxylated with an average of 4 moles of ethylene oxide (0.45 OH equivalents), butanol ethoxylated with an average of 2 moles of ethylene oxide (0.32 OH equivalents), octyl alcohol ethoxylated with an average of 4 moles of ethylene oxide, or other alkoxylated alcohols such as a $C_{9\text{-}11}$ alcohol.8EO or $C_{10\text{-}12}$ alcohol.4EO.

In certain embodiments, the hyper-branched polyether surfactant may have a number average molecular weight of greater than about 500 Daltons, typically about 1000 to about 10,000 Daltons.

In certain embodiments, the subject hyper-branched polyether surfactant may be a reaction product of alkyl alkoxylate and epichlorohydrin, is typically nonionic and may generally comprise fatty alcohol residues such as, but not limited to, $C_6$ to $C_{18}$ fatty alcohol alkoxylates, e.g. ethoxylates, epichlorohydrin residues such as, but not limited to, glycerol ethers, and alkoxylate residues such as but not limited to ethoxylates, and may exhibit more than three endpoints. The hyper-branched polyether surfactant therefore comprises localized hydrophobic areas and hydrophilic areas.

In certain embodiments, the subject hyper-branched polyether surfactant may be produced by reacting at least one of alkyl alkoxylate (ethoxylate), fatty alcohol, fatty alcohol alkoxylate (ethoxylate), or mixtures thereof with epichlorohydrin to form epoxies, and inducing crosslinking to form terminal alcohol residues, permitting reaction of these with epichlorohydrin to form further epoxy groups, crosslinking, and repeating until the desired degree of branching and molecular weight have been achieved.

Various hyper-branched polyether surfactants and their synthesis are disclosed in U.S. Pat. Nos. 5,827,453; 6,110,977; 6,387,962; 6,465,605; 6,572,691; and 6,960,304, which are incorporated herein by reference.

Hyper-branched polyether surfactants are commercially available from BASF Corporation (Florham Park, N.J.). For example, BASF products such as Starfactant™ 20 and Starfactant™ 30 wetting agents and Foamstar™ A10 defoamer comprise such hyper-branched polyether surfactants.

In certain embodiments, the hyper-branched polyether surfactant may be added to the cementitious composition in a dosage range of about 0.0001% to about 0.02% by cementitious weight. In other embodiments, the hyper-branched polyether surfactant may be added in a dosage range of about 0.0002% to about 0.003% and in some embodiments about 0.0002% to about 0.002% by cementitious weight. By "cementitious weight" or "cementitious material weight" is meant by weight of cement and any other hydraulic or latent hydraulic binder such as fly ash, slag, or the like, but not including the weight of water, sand or aggregate.

An admixture for cementitious compositions comprising the subject hyper-branched polyether surfactant is provided, that demonstrates improved surface properties of highly flowable self consolidating concrete (SCC) mixtures to which it is added. Surface properties of the concrete structure are improved by a hyper-branched polyether surfactant which eliminates or significantly reduces surface air bubbles after casting. It has also been demonstrated that any large entrapped air bubbles, which remain in the hyper-branched polyether surfactant-containing concrete mixture, have rapid rupture and release once the air bubbles reach the surface.

Further, the release of entrapped air bubbles from the cementitious composition and the rapid bubble rupture on the surface of the concrete structure has been found to be superior to that caused by higher levels of conventional defoamers such as tributyl phosphate (TBP).

In addition to SCC concrete mixtures, the subject hyper-branched polyether surfactant is effective in reducing air content of concrete exhibiting conventional slump properties.

A cementitious composition is therefore provided, comprising hydraulic cement, water, and a hyper-branched polyether surfactant.

As used herein, the term cement refers to any hydraulic cement. Hydraulic cements are materials that set and harden in the presence of water. Suitable non-limiting examples of hydraulic cements include Portland cement, masonry cement, alumina cement, refractory cement, magnesia cements, such as a magnesium phosphate cement, a magnesium potassium phosphate cement, calcium aluminate cement, calcium sulfoaluminate cement, oil well cement, blended slag, fly ash or pozzolan cement, natural cement, hydraulic hydrated lime, and mixtures thereof. Portland cement, as used in the trade, means a hydraulic cement produced by pulverizing clinker, comprising of hydraulic calcium silicates, calcium aluminates, and calcium ferroaluminates, with one or more of the forms of calcium sulfate as an interground addition. Portland cements according to ASTM C150 are classified as types I, II, III, IV, or V.

Pastes are defined as mixtures composed of a hydraulic cement binder, either alone or in combination with pozzolans such as fly ash, silica fume, or blast furnace slag, and water. Mortars are defined as pastes that additionally include fine aggregate. Concretes are mortars that additionally include coarse aggregate.

The amount of water added to the cementitious composition is calculated based on the desired water to cementitious material (W/C) ratio. The water to cementitious material ratio typically ranges from about 0.2 to about 0.7, with the water and cementitious material being measured by weight.

The subject hyper-branched polyether surfactant may be added to cementitious compositions alone, or optionally in combination with other surfactants or defoamers for cementitious compositions, discussed in more detail below.

The hyperbranched polyether surfactant and optional additional surfactant or defoamer may be added to a cementitious composition that also includes or will include a dispersant for cementitious compositions, or in certain embodiments, the subject admixture comprising a hyper-branched polyether surfactant and optional additional surfactant or defoamer may include a dispersant for cementitious compositions.

Therefore, an aqueous admixture for cementitious compositions is provided, comprising a hyper-branched polyether surfactant, optionally a dispersant for cementitious compositions, optionally an additional surfactant or defoamer, and optionally a stabilizing agent. In certain embodiments in which the aqueous admixture does not include a dispersant, the admixture may comprise about 1 to about 90 weight percent hyper-branched polyether surfactant based on the weight of dry solids, in some embodiments about 2 to about 80 weight percent.

In certain embodiments, an admixture for cementitious compositions is provided comprising a hyper-branched polyether surfactant, a dispersant for cementitious compositions, optionally an additional surfactant or defoamer, and optionally a stabilizing agent.

The amount of the dispersant for cementitious compositions that may be present in a cementitious mixture may range from about 0.01 weight percent to about 2 weight percent based on the weight of the cementitious material. In certain embodiments, the amount of dispersant for cementitious compositions that is present in a cementitious mixture may be in the range from about 0.05 weight percent to about 0.5 weight percent based on the weight of the cementitious material.

The term dispersant as used throughout this specification includes, among others, polycarboxylate dispersants, with or without polyether units. The term dispersant is also meant to include those chemicals that also function as a plasticizer, water reducers, high range water reducers, fluidizer, antiflocculating agent, or superplasticizer for cementitious compositions, such as lignosulfonates (calcium lignosulfonates, sodium lignosulfonates and the like), salts of sulfonated naphthalene sulfonate condensates, salts of sulfonated melamine sulfonate condensates, beta naphthalene sulfonates, sulfonated melamine formaldehyde condensates, naphthalene sulfonate formaldehyde condensate resins for example LOMAR D® dispersant (BASF Corporation, Florham Park N.J.), polycarboxylates, polycarboxylate ethers, polyaspartates, oligomeric dispersants, and mixtures thereof.

The term polycarboxylate dispersant throughout this specification refers to polymers with a carbon backbone with pendant side chains, wherein at least a portion of the side chains are attached to the backbone through a carboxyl group, an ether group, an amide group or an imide group. Polycarboxylate dispersants typically include cement particle bonding moieties, such as but not limited to carboxylic acid groups, and dispersing side chains that may include polyoxyalkylene ethers, and may further include other functional moieties. Polycarboxylate copolymers may contain structural units derived from or produced to include moieties of mono- or di-carboxylic acids, mono- or di-carboxylic acid esters, alkenyl ethers, and other ethylenically unsaturated species. In certain embodiments, the polycarboxylate copolymer may also comprise hydrolysable moieties that expose additional cement particle-binding functional moieties on the polymer upon hydrolysis.

The polycarboxylate dispersants used in the admixture, cementitious composition, and method may include but is not limited to dispersants or water reducers sold under the trademarks GLENIUN® 3030NS, GLENIUM® 7101, GLENIUM® 7500, GLENIUM® 7700, GLENIUM® 7710, or GLENIUM® 3000NS® (BASF Admixture Systems, Cleveland, Ohio), ADVA® (W. R. Grace Inc., Cambridge, Mass.), VISCOCRETE® (Sika, Zurich. Switzerland), and SUPERFLUX® (Axim Concrete Technologies Inc., Middlebranch, Ohio).

The term oligomeric dispersant refers to oligomers that are a reaction product of: component A, optionally component B, and component C: wherein each component A is independently a nondegradable, functional moiety that adsorbs onto a cementitious particle; wherein component B is an optional moiety, where if present, each component B is independently a nondegradable moiety that is disposed between the component A moiety and the component C moiety; and wherein component C is at least one moiety that is a linear or branched water soluble, nonionic polymer substantially non-adsorbing to cement particles. Without limitation, suitable oligomeric dispersants are disclosed in U.S. Pat. No. 6,133,347. U.S. Pat. No. 6,492,461, U.S. Pat. No. 6,451,881, U.S. Pat. No. 6,861,459 and U.S. Pat. No. 6,908,955, which are hereby incorporated by reference as if fully written out below.

The subject cementitious composition, containing the hyper-branched polyether surfactant, may in certain embodiments additionally comprise an additional surfactant and/or defoamer compound.

Non-limiting examples of surfactants or defoamers, many of which may be water insoluble, useful to assist in controlling the air content of cementitious compositions include chemicals based on mineral or vegetable oils, fats and oils, Catty acids, fatty acid esters, any chemical with —OH (hydroxyl) functionality (such as alcohols, particularly fatty alcohols), amides, phosphoric esters, metal soaps, silicones, oxyalkylenes, polymers containing propylene oxide and/or ethylene oxide moieties, liquid hydrocarbons, and acetylenic diol derivatives.

Non-limiting examples of water insoluble surfactants or defoamers also include the following: kerosene, liquid paraffin, animal oil, vegetable oil, sesame oil, castor oil, alkylene oxide adducts thereof, oleic acid, stearic acid and alkylene oxide adducts thereof, diethylene glycol laurate, glycerin monorecinolate, alkenyl succinic acid derivatives, sorbitol monolaurate, sorbitol trioleate, polyoxyethylene monolaurate, polyoxyethylene sorbitol monolaurate, natural wax, linear or branched fatty alcohols and their alkoxylated derivatives, octyl alcohol, hexadecyl alcohol, acetylene alcohol, glycols, polyoxyalkylene glycol, nonyl phenol, ethoxylated nonyl phenol, polyoxyalkylene amide, acrylate polyamine, tributyl phosphate, triiosobutyl phosphate, sodium octyl phosphate; aluminum stearate, calcium oleate, silicone oil, silicone paste, silicone emulsion, organic modified polysiloxane, fluorosilicone oil; polypropylene oxide and polyoxyethylene polyoxypropylene adducts. Some of the surfactants or defoamers in the preceding list containing alkylene oxides may be water soluble.

Illustrative examples of optional surfactants or defoamers include but are not limited to block copolymers of ethylene oxide and propylene oxide, such as PLURONIC® products available from BASF. Other examples of additional surfactants or defoamers useful to control the air content in cementitious compositions include DYNOL™ 604, SURFYNOL® 440, SURFYNOL® 104, SURFYNOL® 2502, SURFYNOL® 420, and SURFYNOL® DF-75, (Air Products and Chemicals, Inc.) TERGITOL® NP ethylene oxide and nonylphenol (ethoxylated nonylphenol) polymer (Union Carbide Company), and JEFFOX® alkyl polyoxyalkylenes (Huntsman Chemical Company).

In order to increase stability of the water insoluble defoamers in an aqueous formulation prior to incorporation in the cementitious composition, a stabilizing agent such as a solubilizing agent may be used. Examples of suitable stabilizing or solubilizing agents include but are not limited to an amine salt that stabilizes or solubilizes the water insoluble defoamer that may assist in producing controllable air contents in both non-air entrained and air entrained cementitious compositions.

An activated amine refers to an amine surfactant that has been reacted with an acid to form a water soluble salt. A deactivated amine refers to an amine surfactant which is in the unprotonated (non-salt) form. In the alkaline pH environment of the cementitious composition, the amine is inactivated to the unprotonated (non-salt) form, and greater defoaming performance is observed.

An amine salt capable of stabilizing or solubilizing the water insoluble defoamer in an acidic medium may comprise at least one of (mono, di, or tri)alkyl amine, (mono, di, tri) alkyl ether amine, alkoxylated amine, alkyl amide amine, alkyl imidazoline, alkyl (di or tri,) amine, alkyl (di or tri) ether amine, alkoxylated (di or tri) amine, ethoxylated alkyl ether amine, or mixtures thereof. The amine may be effective as a stabilizing or solubilizing agent in the salt form and may be deactivated at an alkaline pH. In one embodiment the amine salt has a molecular weight of about 100 to about 1000 Daltons.

Illustrative examples include but are not limited to ether amines such as octyl/decyloxypropyl-1,3-diaminopropane, isodecyloxypropyl-1,3-diaminopropane, isododecyloxypropyl-1,3-diaminopropane, dodecyl/tetradecyloxypropyl-1,3-diaminopropane, isotridecyloxypropyl-1,3-diaminopropane, tetradecyloxypropyl-1,3-di aminopropane; ethoxylated alkyl diamine or alkyl diamine such as isopropyloxypropyl amine, isohexyloxypropyl amine, 2-ethylhexyloxypropyl amine, octyl/decyloxypropyl amine, isodecyloxypropyl amine, isodecyloxypropyl amine, dodecyl/tetradecyloxypropyl amine, isotridecyloxypropyl amine, tetradecyloxypropyl amine, tetradecyl/dodecyloxypropyl amine, or linear alkyloxypropyl amine, octadecyl/hexadecyloxypropyl amine; ethoxylated ether amines such as iso-(2-hydroxyethyl) isodecyloxypropylamine, poly (5) oxyethylene isodecyloxypropylamine, his-(2-hydroxyethyl) isotridecyloxypropylamine, poly (5) oxyethylene isotridecyloxypropylamine, bis-(2-hydroxyethyl) linear C12-15 alkyloxypropylamine, bis-(2-hydroxyethyl) octadecylamine (&5, 15 mole adduct), bis-(2-hydroxyethyl) soya amine (&15 mole adduct), orbis-(2-hydroxyethyl) tallow amine (&5, 15 mole adduct).

Further illustrative examples of amine salt stabilizing or solubilizing agents that can be used are di coco alkylamine, tridodecyl amine, oleyl dimethyl amine, hydrogenated tallow dimethylamine, oleyl amine, dodecyl dimethyl amine, dodecyl amine, hexadecyl dimethyl amine, tallow amine, dodecyl ether amine or tetradecyl ether amine, ethoxylated(2)cocoalkyl amine, propoxylated(2)tallowalkyl amine, propoxylated tallow diamine, bis(2-hydroxyethyl)oleyl amine, bis(2-hydroxyethyl)octadecyl amine, polyoxyethylene(15) tallowalkyl amine, bis(2-hydroxyethyl)cocoalkyl amine or N-oleyl-1,1-iminobis-2-propanol, lauramidopropyl dimethylamine, stearamidopropyl dimethylamine or oleamidopropyl dimethylamine, 1-(2-hydroxyethyl)-2-(heptadecenyl)imidazoline, oleyl hydroxyethyl imidazoline, or cocoalkyl hydroxyethyl imididazoline, oleyl diamine, tallow pentamine, tallow tetramine, tallow triamine, N-oleyl-1,3-diaminopropane, tris(2-hydroxyethyl)-N-tallowalkyl-1,3-diaminopropane, iso tridecyloxypropyl-1,3-diaminopropane or tetra decyloxypropyl-1,3-diaminopropane, ethoxylated(3)N-tallow-1,3-diaminopropane, or mixtures thereof.

Examples of other stabilizing agents include, but are not limited to, styrene-maleic copolymer, derivatized styrene-maleic copolymer, and/or alkoxylated, carboxylated alkoxylated, sulfated alkoxylated, and/or sulfonated alkoxylated compounds of a hydrocarbon, sorbitan, polyethylene oxide, polypropylene oxide, fatty acid, fatty alcohol, isononanol, $C_8$-$C_{22}$ alkyl amine, styrene maleic copolymer, or derivatized styrene-maleic copolymer. The hydrocarbon may contain from 1 to about 22 carbons, and the fatty acid and fatty alcohol may contain from about 8 to about 22 carbon atoms. Illustrative alkoxylates are molecules containing ethylene oxide and/or propylene oxide. Illustrative derivatized groups for the derivatized styrene-maleic copolymers include, but are not limited to, sulfonated, hydroxy alkyl ester, and dimethyl amino propyl. Examples of alkyl-ether sulfonates are AVANEL products from BASF. Alkyl-ether carboxylates are available from Hickson DanChem under the tradename NEODOX.

In certain embodiments, the stabilizing or solubilizing agent may be at least one of:
a. block copolymers of ethylene oxide and propylene oxide;
b. acetylenic diols;
c. mono alkyl polyoxyalkylenes;
d. ethoxylated nonylphenols:
e. an alkyl-ether sulfonate represented by $R^5$—$(OCH_2CH_2)_n$—$SO_3M$, wherein $R^5$ is an alkyl with 6 to 18 carbon atoms, and n is an integer from 1 to 15:
f. an alkyl-ether carboxylate represented by $R^6O(CHR^7CH_2O)_nCH_2CH_2COOM$, wherein $R^6$ is a $C_4$-$C_{18}$ hydrocarbon, $R^7$=H or $CH_3$, n=1-30, m=H, Na, K, Li, Ca, Mg, amine, or ammonia; and
g. a styrene-maleic copolymer given by the following formula:

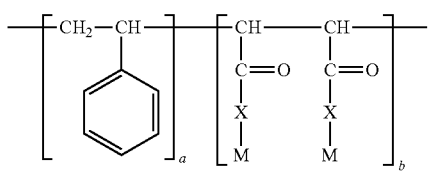

wherein M is independently at least one of H, Na, K, Ca, Mg, alkyl, substituted alkyl, aryl, substituted aryl, or an oxyalkylene group $(R^8O)_n$—$R^9$, wherein $R^8$ is a $C_2$-$C_4$ alkylene group, and $R^9$ is H or $C_1$-$C_{22}$ alkyl group, alkyl-aryl group, or aryl group, n=1-500, X is —O— or —$NHR^{10}$, with the proviso that an anhydride may be formed when X is —O—, and an imide ring may be formed when X is —$NHR^{10}$, and $R^{10}$ is H, alkyl, substituted alkyl, aryl, substituted aryl, or an oxyalkylene group $(R^8O)_n$—$R^9$. The molar ratio of styrene (a) to maleic (b) may be greater than 1:1, in certain embodiments the styrene:maleic ratio is ≥2:1. The subscripts a and b may be numbers such that the copolymer has a number average molecular weight from about 1,000 to about 20,000 Daltons.

The hyper-branched polyether surfactant can be combined with the dispersant for cementitious compositions to form an admixture for cementitious compositions, referred to herein as "combination admixture". Optionally the admixture may further comprise at least one of an additional surfactant and/or defoamer, in certain embodiments a water insoluble surfactant or defoamer, and an amine stabilizing or solubilizing agent. If an amine stabilizing or solubilizing agent is present, then an acid may be used to protonate and activate the amine. Suitable acids include but are not limited to acetic acid, formic acid, propionic acid, lactic acid or gluconic acid. The combination of an amine stabilizing or solubilizing agent with the hyper-branched polyether surfactant and a dispersant for cementitious compositions, and optionally additional surfactant and/or water insoluble defoamer, provides an admixture that is stable over time in that there is little or no phase separation between the dispersant and defoamers.

The amine stabilizing or solubilizing agents may be at least partially effective themselves as defoamers for cementitious compositions. But, the combination of amine stabilizing or solubilizing agents and the hyper-branched polyether surfactant provides increased air control in cementitious mixtures over the use of amine stabilizing or solubilizing agents alone.

The amount of the dispersant for cementitious compositions that is present in the combination admixture ranges from greater than 0 to about 99% based on the weight of dry solids. The amount of the dispersant for cementitious compositions that is present in a cementitious mixture may range from greater than 0% to about 2% primary active ingredient based on the dry weight of cementitious material.

The amount of stabilizing or solubilizing agent that is present in the combination admixture is at least the amount sufficient to obtain a stable solution. In certain embodiments in which the stabilizing or solubilizing agent is present, the amount in the admixture may be from about 0.02% to about 10% based on the weight of dry solids. In some embodiments the amount of stabilizing or solubilizing agent that is present in a cementitious mixture may range from about 0.0001% to about 0.1% primary active ingredient based on the dry weight of cementitious material. In embodiments wherein the stabilizing agent comprises an amine salt solubilizing agent, the amine salt solubilizing material may be present in the amount of up to about 0.04% by weight of cementitious material.

The amount of hyper-branched polyether surfactant and optionally additional surfactant or defoamer present in the combination admixture may range from about 0.1% to about 10% based on weight of dry solids. In certain embodiments, the amount of hyper-branched polyether surfactant and optionally additional surfactant or defoamer present in the admixture may range from about 0.25% to about 10% based on weight of dry solids. The amount of hyper-branched polyether surfactant and optionally additional surfactant or defoamer present in a cementitious mixture may range from about 0.0002% to about 0.05% primary active ingredient based on the dry weight of cementitious material.

The amount of hyper-branched polyether surfactant in the combination admixture where no additional surfactant or defoamer is present may range from about 0.1% to about 10% based on weight of dry solids, optionally about 0.2% to about 4%.

The weight ratio of amine stabilizing or solubilizing agent to hyper-branched polyether surfactant may range from about 0.25:1 to about 5:1.

The amount of acid that is present in the combination admixture is at least the amount sufficient to form an acid activated water soluble amine salt. In certain embodiments in which the amine stabilizing or solubilizing agent is present, the amount of added acid in the admixture may range from 0% to about 25% based on the weight of dry solids. In some embodiments, the amount of added acid present in a cementitious mixture may range from 0% to about 2% primary active ingredient based on the dry weight of cementitious material. In certain embodiments, the acidic medium used to form an acid activated water soluble amine salt may be provided by dispersant.

Elevated temperature stability for any combination of hyper-branched polyether surfactant, optional additional surfactant or defoamer, and dispersant for cementitious compositions can be obtained by increasing the level of the stabilizing or solubilizing agent or reducing the amount of insoluble surfactant or defoamer.

The cementitious composition may contain other additives or ingredients and need not be limited to the formulations detailed herein. Cement additives that can be added independently include, but are not limited to: air entrainers, air detrainers, aggregates, pozzolans, set and strength accelerators/enhancers, set retarders, water reducers, workability retaining admixtures, corrosion inhibitors, wetting agents, water soluble polymers, rheology modifying agents, water repellents, fibers, dampproofing admixtures, permeability reducers, pumping aids, fungicidal admixtures, germicidal admixtures, insecticide admixtures, finely divided mineral admixtures, pigments, colorants, alkali-reactivity reducer, bonding admixtures, shrinkage reducing admixtures, and any other admixture or additive that does not adversely affect the desired properties of the cementitious composition. The cementitious compositions need not contain one of each of the foregoing additives.

EXAMPLES

Examples 1 & 2

The performance of the subject hyper-branched polyether surfactant for controlling air content in a cementitious composition comprising a polycarboxylate ether dispersant was evaluated with reference to a commercially available admixture formulation (FORM 1) comprising a polycarboxylate ether dispersant, a defoaming agent and a stabilizing agent. The cementitious composition comprised a self consolidating concrete mixture comprising greater than 800 pounds (363 kg) total cementitious material and an amount of an aggregate (sand and stone) blend sufficient to avoid component segregation. The water/cementitious material (W/C) ratio and the results of the tests are reported in Table A below.

In the following examples, the slump and slump flow of the test compositions were determined by placing a cone on a flat surface, filling the cone with the cementitious composition, and removing the cone, as described in ASTM C143, except that the cone was filled without rodding. The composition would then flow, and the displaced height (slump) of the resulting mound of the cementitious composition, and/or the diameter (slump flow) of the base of the mound, were measured in inches. T-50 reports the time at which 50 cm of flow diameter is achieved. Air content was tested by the pressure method (ASTM C231).

TABLE A

|  | Example | |
| --- | --- | --- |
|  | 1 | 2 |
| Dose (% cmts) |  | 0.00055 |
| Admixture |  | Starfactant ™ 20 |
| Dose (% cmts) | 0.105 | 0.105 |
| Admixture | FORM 1 | PCE |
| W/C | 0.35 | 0.33 |
| Slump Flow (in)/(cm) | | |
| 5 min. | 25.5/64.8 | 29.25/74.30 |
| T-50 Time (sec.) | 5.0 | 3.3 |
| Air Content (%) | | |
| 5 min. | 2.4 | 1.4 |
| Gravametric Air (%) | | |
| Initial | 2.1 | 2.2 |

(cmts = cementitious)

The use of the hyper-branched polyether surfactant with the polycarboxylate ether dispersant in a self consolidating concrete cementitious composition gave excellent air content control and improved surface appearance while maintaining high slump flow values in relation to the commercial formulation.

Examples 3-9

The performance of the subject hyper-branched polyether surfactant in combination with a high molecular weight polyether stabilizing agent (Examples 6 and 9) for controlling air content in a self consolidating concrete cementitious composition comprising a polycarboxylate ether dispersant was evaluated with reference to a commercially available admixture formulation (FORM 1) comprising a polycarboxylate ether dispersant, a defoaming agent and a stabilizing agent (Example 3); an experimental admixture formulation (FORM 2) comprising a polycarboxylate ether dispersant, an organic defoaming agent and a high molecular weight polyether stabilizing agent (Examples 4 and 8); a commercially available admixture formulation (FORM 3) comprising a polycarboxylate dispersant, an organic defoaming agent and a stabilizing agent (Example 7); and a polycarboxylate ether dispersant without a surfactant or defoamer (Example 5). The cementitious composition comprised a self consolidating concrete mixture comprising greater than 800 pounds (363 kg) total cementitious material and an amount of an aggregate (sand and stone) blend sufficient to avoid component segregation. The water/cementitious material (W/C) ratio and the results of the tests are reported in Table B below.

TABLE B

| Example | 3 | 4 | 5 | 6 | 7 | 8 | 9 |
| --- | --- | --- | --- | --- | --- | --- | --- |
| Dose (% cmts) |  |  |  | 0.0015 |  |  | 0.0015 |
| Admixture |  |  |  | Stabilizer |  |  | Stabilizer |
| Dose (% cmts) |  |  |  | 0.00055 |  |  | 0.00055 |
| Admixture |  |  |  | Starfactant ™ 20 |  |  | Starfactant ™ 20 |
| Dose (% cmts) | 0.105 | 0.105 | 0.105 | 0.105 | 0.105 | 0.105 | 0.105 |
| Admixture | FORM 1 | FORM 2 | PCE | PCE | FORM 3 | FORM 2 | PCE |
| W/C | 0.33 | 0.33 | 0.33 | 0.33 | 0.33 | 0.33 | 0.33 |
| Slump Flow (in)/(cm) | | | | | | | |
| 7 min. (*5 min.) $T_{50}$ (sec.) | 28.25/71.76 | 29.25/74.30 | 28.25/71.76 | 27.75/70.49 | 25.00*/63.50* | 28.5/72.39 | 29.00/73.66 |
| 7 min. (*5 min.) Air Content (%) | 3.5 | 3.6 | 4.0 |  | 2.3* | 4.0 | 3.1 |
| 7 min. (*5 min.) Gravametric Air (%) | 2.4 | 1.2 | 3.4 | 1.6 | 2.4* | 1.6 | 1.5 |
| Initial | 3.4 | 2.7 | 4.7 | 2.5 | 1.9* | 2.7 | 2.8 |

The use of the stabilized hyper-branched polyether surfactant with the polycarboxylate ether dispersant in a self consolidating concrete cementitious composition gave excellent air content control while maintaining high slump flow values in relation to the commercial formulations and the experimental formulation. The use of the polycarboxylate ether dispersant alone allowed the incorporation of more air than did the stabilized hyper-branched polyether surfactant with the polycarboxylate ether dispersant or any of the formulations tested.

Examples 10-18

The air content controlling performance of the subject hyper-branched polyether surfactant in combination with a fatty amine stabilizing agent (Example 17) in a self consolidating concrete cementitious composition comprising a polycarboxylate ether dispersant, and a combination admixture (Star 1) comprising varying amounts of the subject hyper-branched polyether surfactant with respect to a polycarboxylate ether dispersant and a high molecular weight polyether stabilizing agent (Examples 11-13) were evaluated with reference to a commercially available admixture formulation (FORM 1) comprising a polycarboxylate ether dispersant, a defoaming agent and a stabilizing agent (Example 10); an experimental admixture formulation (FORM 4) comprising varying amounts of an organic defoamer with respect to a polycarboxylate ether dispersant and a high molecular weight polyether stabilizing agent (Examples 14-16), and a polycarboxylate ether dispersant in combination with a nonionic organic defoaming agent (Example 18).

Formulations Star 1-1, Star 1-2 and Star 1-3 contained the hyper-branched polyether surfactant at the levels of 0.5%, 0.25% and 0.1% by weight of the admixture solids respectively, and Formulations FORM 4-1, FORM 4-2 and FORM 4-3 contained the organic defoamer at the levels of 0.5%, 0.25% and 0.1% by weight of the admixture solids respectively.

The use of the stabilized hyper-branched polyether surfactant with the polycarboxylate ether dispersant in a self consolidating concrete cementitious composition provided air content control, with the hyper-branched polyether surfactant containing admixture giving excellent results at loadings above 0.1% by weight of dispersant in this particular embodiment, while maintaining high slump flow values and improved surface appearance in relation to the commercial formulation and experimental formulations. Example 17 showed somewhat elevated air contents, which has been attributed to a non-optimally high surfactant to defoamer ratio. The cementitious composition comprised a self consolidating concrete mixture comprising greater than 800 pounds (363 kg) total cementitious material and an amount of an aggregate (sand and stone) blend sufficient to avoid component segregation. The water/cementitious material (W/C) ratio and the results of the tests are reported in Table C below.

Examples 19-26

The performance of the subject hyper-branched polyether surfactant (Foamstar™ A10, Star 2, Starfactant™ 20) for controlling air content in a self consolidating concrete cementitious composition comprising a polycarboxylate ether dispersant (Examples 20, 21, 22, 23 and 26) was evaluated with reference to a commercially available admixture formulation (FORM 1) comprising a polycarboxylate ether dispersant, a defoaming agent and a stabilizing agent (Example 19), and a nonionic organic surfactant in combination with a polycarboxylate ether dispersant (Examples 24 and 25).

The use of the stabilized hyper-branched polyether surfactant with the polycarboxylate ether dispersant in a self consolidating concrete cementitious composition gave excellent air content control while maintaining high slump flow values in relation to the commercial formulation and nonionic organic surfactant. The cementitious composition comprised a self consolidating concrete mixture comprising greater than 800 pounds (363 kg) total cementitious material and an amount of an aggregate (sand and stone) blend sufficient to avoid component segregation. The water/cementitious material (W/C) ratio and results of the tests are reported in Table D below.

TABLE C

| Example | 10 | 11 | 12 | 13 | 14 | 15 | 16 | 17 | 18 |
|---|---|---|---|---|---|---|---|---|---|
| Dose (% PC) Admixture | | | | | | | | 0.250 Starfactant™ 20 & Fatty Amine Stabilizer | 0.100 Nonionic Organic Defoamer |
| Dose (% cmts) Admixture | 0.105 FORM 1 | 0.105 Star 1-1 | 0.105 Star 1-2 | 0.105 Star 1-3 | 0.105 FORM 4-1 | 0.105 FORM 4-2 | 0.105 FORM 4-3 | 0.105 PCE | 0.105 PCE |
| W/C | 0.34 | 0.34 | 0.34 | 0.34 | 0.34 | 0.34 | 0.34 | 0.34 | 0.34 |
| $T_{50}$ (sec.) | | | | | | | | | |
| 7 min. Slump Flow (in)/(cm) | 1.90 | 1.70 | NA | 1.50 | 1.20 | 1.45 | 1.20 | 1.70 | 1.60 |
| 7 min. Air Content (%) | 25.75/65.41 | 28.75/73.03 | 28.50/72.39 | 28.50/72.39 | 28.25/71.76 | 28.50/72.39 | 28.50/72.39 | 27.25/69.22 | 28.50/72.39 |
| 7 min. Gravametric Air (%) | 2.6 | 1.1 | 2.1 | 3.7 | 1.1 | 2.1 | 2.5 | 4.2 | 4.2 |
| Initial | 3.3 | 1.6 | 2.1 | 4.3 | 1.9 | 2.8 | 3.8 | 4.7 | 5.1 |

TABLE D

| Example | 19 | 20 | 21 | 22 | 23 | 24 | 25 | 26 |
|---|---|---|---|---|---|---|---|---|
| Dose (% cmts) Admixture | | 0.00055 Foamstar ™ A10 | 0.0011 Foamstar ™ A10 | 0.00055 Star 2 | 0.0011 Star 2 | 0.00055 Nonionic Organic Surfactant | 0.0011 Nonionic Organic Surfactant | 0.00055 Starfactant ™ 20 |
| Dose (% cmts) Admixture | 0.110 FORM 1 | 0.110 PCE | 0.110 PCE | 0.110 PCE | 0.110 PCE 7 | 0.110 PCE | 0.110 PCE | 0.110 PCE |
| W/C | 0.35 | 0.35 | 0.35 | 0.35 | 0.35 | 0.35 | 0.35 | 0.35 |
| Slump Flow (in)/(cm) 7 min. | 26.00/66.04 | 25.00/63.50 | 26.00/66.04 | 25.25/64.14 | 24.00/60.96 | 25.75/65.41 | 26.25/66.68 | 24.50/62.23 |
| $T_{50}$ Time (sec.) | 2.40 | 2.46 | 1.96 | 2.21 | 2.43 | 2.36 | 1.72 | 2.07 |
| Air Content (%) 8 min. | 2.1 | 2.2 | 1.7 | 1.2 | 1.4 | 4.5 | 4.0 | 1.3 |
| Gravametric Air (%) Initial | 1.5 | 1.4 | 0.8 | 0.9 | 1.6 | 4.5 | 3.6 | 1.4 |

Examples 27-32

The performance of a combination admixture formulation (Examples 28, 30 and 32) comprising the subject hyper-branched polyether surfactant, a polycarboxylate ether dispersant, and an amine surfactant stabilizing agent (Star 3), was evaluated for controlling air content in a self consolidating concrete cementitious composition, with reference to a commercially available admixture formulation (FORM 1) comprising a polycarboxylate ether dispersant, a defoaming agent and a stabilizing agent (Examples 27, 29 and 31). The cementitious composition comprised a self consolidating concrete mixture comprising greater than 800 pounds (363 kg) total cementitious material and an amount of an aggregate (sand and stone) blend sufficient to avoid component segregation. The water/cementitious material (W/C) ratio and the results of the tests are reported in Table E below.

the cementitious compositions of Examples 28, 30 and 32, comprising the subject hyper-branched polyether surfactant and dispersant containing combination admixture formulation, exhibited improved compressive strength (tested according to ASTM C39) in comparison to the cementitious composition comprising the commercial admixture formulation.

Examples 33-35

The performance of the Star 3 admixture formulation described above (Example 33) and a combination admixture formulation (Example 35) comprising the subject hyper-branched polyether surfactant, a polycarboxylate ether dispersant, and a high molecular weight polyether stabilizing agent (Star 4), were evaluated for controlling air content in self consolidating concrete cementitious compositions, with

TABLE E

| Example | 27 | 28 | 29 | 30 | 31 | 32 |
|---|---|---|---|---|---|---|
| Dose (% cmts) Admixture | 0.120 FORM 1 | 0.120 Star 3 | 0.100 FORM 1 | 0.100 Star 3 | 0.080 FORM 1 | 0.080 Star 3 |
| W/C | 0.342 | 0.342 | 0.342 | 0.342 | 0.342 | 0.342 |
| Slump Flow (in)/(cm) 7 min. Air Content (%) | 28.00/71.12 | 28.00/71.12 | 25.50/64.77 | 24.50/62.23 | 20.25/51.44 | 19.50/49.53 |
| 8 min. Gravametric Air (%) | 1.9 | 1.0 | 2.1 | 2.0 | 2.4 | 2.1 |
| Initial Comp Strength | 3.4 | 2.5 | 3.1 | 3.4 | 3.7 | 3.3 |
| 28 day (psi) | 8840 | 9220 | 8950 | 9220 | 9080 | 9090 |
| 28 day (MPa) | 61.0 | 63.6 | 61.7 | 63.6 | 62.6 | 62.7 |

The use of the stabilized hyper-branched polyether surfactant and polycarboxylate ether dispersant containing combination admixture formulation at three admixture dosages and three different cementitious mixture consistencies in a self consolidating concrete cementitious composition gave excellent air content control while maintaining high slump flow values in relation to the commercial formulation. In addition, reference to a commercially available admixture formulation (FORM 1) comprising a polycarboxylate ether dispersant, a defoaming agent and a stabilizing agent (Example 34). The cementitious compositions comprised a self consolidating concrete mixture comprising greater than about 700 pounds (317 kg) total cementitious material and an amount of an aggregate (sand and stone) blend sufficient to avoid component segregation. The water/cementitious material (W/C) ratio and the results of the tests are reported in Table F below.

TABLE F

| Example | 33 | 34 | 35 |
|---|---|---|---|
| Dose (% cmts) | 0.088 | 0.088 | 0.088 |
| Admixture | Star 3 | FORM 1 | Star 4 |
| W/C | 0.42 | 0.42 | 0.42 |
| Slump (in)/(cm) | | | |
| 7 min. (9 min.*) Slump Flow (in)/(cm) | — | — | — |
| 7 min. (12 min.*) | 24.00*/60.96* | 23.00/58.42 | 23.50/59.69 |
| T$_{50}$ Time (sec.) | 2.38 | 2.47 | 2.54 |
| Air Content (%) | | | |
| Initial Gravametric Air (%) | 1.1 | 2.3 | 1.3 |
| Initial Comprehensive Strengths | 0.8 | 2.7 | 2.1 |
| 7 Day (psi) | 3650 | 3630 | 3770 |
| 7 Day (MPa) | 25.2 | 25.0 | 26.0 |
| 28 Day (psi) | 6640 | 6520 | 6600 |
| 28 Day (MPa) | 45.8 | 45.0 | 45.5 |

The use of the stabilized hyper-branched polyether surfactant and polycarboxylate ether dispersant containing admixture formulations in the self consolidating concrete cementitious compositions gave excellent air content control while maintaining consistent slump and/or slump flow values in relation to the commercial formulation. In addition, the cementitious compositions of Examples 33 and 35 comprising the subject hyper-branched polyether surfactant and dispersant containing admixture formulations, exhibited similar compressive strength in comparison to the cementitious composition comprising the commercial admixture formulation.

Examples 36-38

The performance of the Star 3 admixture formulation described above (Example 36) was evaluated for controlling air content in a standard slump concrete cementitious composition, with reference to a commercially available admixture formulation (FORM 1) comprising a polycarboxylate ether dispersant, a defoaming agent and a stabilizing agent (Example 38); and a commercially available admixture formulation (FORM 3) comprising a polycarboxylate dispersant, an organic defoaming agent and a stabilizing agent (Example 37). The cementitious compositions comprised a standard slump concrete mixture comprising greater than 800 pounds (363 kg) total cementitious material and an amount of an aggregate (sand and stone) blend sufficient to avoid component segregation. The water/cementitious material (W/C) ratio and the results of the tests are reported in Table G below.

TABLE G

| | Example | | |
|---|---|---|---|
| | 36 | 37 | 38 |
| Dose (% cmts) | 0.042 | 0.042 | 0.042 |
| Admixture | Star 3 | FORM 3 | FORM 1 |
| W/C | 0.35 | 0.35 | 0.35 |

TABLE G-continued

| | Example | | |
|---|---|---|---|
| | 36 | 37 | 38 |
| Slump (in)/(cm) | | | |
| 7 min. (9 min.*) Slump Flow (in)/(cm) | 8.50/21.6 | 8.25/21.0 | 8.25/21.0 |
| 7 min. (9 min*.) Air Content (%) | 11.50*/29.21* | 12.00/30.48 | 13.50/34.29 |
| Initial Gravametric Air (%) | 2.1 | 1.9 | 2.2 |
| Initial Comprehensive Strengths | 2.0 | 2.1 | 2.4 |
| 7 Day (psi) | 5200 | 5360 | 5120 |
| 7 Day (MPa) | 35.9 | 37.0 | 35.3 |
| 28 Day (psi) | 8240 | 8310 | 8200 |
| 28 Day (MPa) | 56.8 | 57.3 | 56.6 |

The use of the stabilized hyper-branched polyether surfactant and polycarboxylate ether dispersant containing admixture formulation in the standard slump concrete cementitious composition gave excellent air content control while maintaining consistent slump and/or slump flow values in relation to the commercial formulations. In addition, the cementitious composition of Example 36 comprising the subject hyper-branched polyether surfactant containing admixture formulations, exhibited similar compressive strength in comparison to the cementitious compositions comprising the commercial admixture formulations.

Examples 39-43

The performance of the subject hyper-branched polyether surfactant in a self consolidating concrete cementitious composition comprising a polycarboxylate ether dispersant (Example 39), a combination admixture formulation (Example 43) comprising the subject hyper-branched polyether surfactant, a polycarboxylate ether dispersant, and an amine surfactant stabilizing agent (Star 3), and a combination admixture formulation (Examples 41 and 42) comprising the subject hyper-branched polyether surfactant, a polycarboxylate ether dispersant, and a high molecular weight polyether stabilizing agent (Star 4), were evaluated for controlling air content in a self consolidating concrete cementitious composition, with reference to a commercially available admixture formulation (FORM 1) comprising a polycarboxylate ether dispersant, a defoaming agent and a stabilizing agent (Example 40).

The cementitious composition comprised a self consolidating concrete mixture comprising greater than 800 pounds (363 kg) total cementitious material and an amount of an aggregate (sand and stone) blend sufficient to avoid component segregation. The water/cementitious material (W/C) ratio and the results of the tests are reported in Table H below.

TABLE H

| | Example # | | | | |
|---|---|---|---|---|---|
| | 39 | 40 | 41 | 42 | 43 |
| Dose (% cmts) | 0.0015 | | | | |
| Admixture | Starfactant ™ 20 | | | | |
| Dose (% cmts) | 0.145 | 0.145 | 0.145 | 0.145 | 0.145 |

TABLE H-continued

| | Example # | | | | |
|---|---|---|---|---|---|
| | 39 | 40 | 41 | 42 | 43 |
| Admixture | PCE | FORM-1 | STAR-4 | STAR-4 | STAR-3 |
| W/C | 0.36 | 0.37 | 0.37 | 0.37 | 0.37 |
| Slump Flow (in)/(cm) | | | | | |
| 7 min. | 24.50/ 62.23 | 23.75/ 60.33 | 26.50/ 67.31 | 23.25/ 59.06 | 24.00/ 60.96 |
| T50 Time (sec) | 2.60 | 2.12 | 1.65 | 2.23 | 2.54 |
| Air Content (%) | | | | | |
| 8 min. Gravametric Air (%) | 1.2 | 1.8 | 1.1 | 1.2 | 1.0 |
| Initial Slab Surface Rank | 0.3 Good | 0.2 Poor | −0.4 Good | 0.0 Good | −0.4 Good |

The use of the subject hyper-branched polyether surfactant with a polycarboxylate ether dispersant in a self consolidating concrete cementitious composition, and the stabilized hyper-branched polyether surfactant and polycarboxylate ether dispersant containing combination admixture formulations, gave excellent air content control while maintaining high slump flow values for the self consolidating concrete cementitious composition in relation to the commercial admixture formulation, and resulted in a defect-free concrete surface.

Visual Observations of the surface of the concrete produced in Examples 39-43 resulted in the following subjective comments:

Example 39 No bubbles, no surface defects, no carbon spotting. Good final surface.

Example 40 Lots of bubbles 1-3 mm diameter, quick pop, instant defects. Poor final surface.

Example 41 Very few bubbles, about 1 mm diameter, quick pop, no defects. Good final surface.

Example 42 Very few bubbles, about 1 mm diameter, quick pop, no defects. Good final surface.

Example 43 Very few bubbles, about 1 mm diameter, quick pop, no defects. Good final surface.

A cementitious composition is therefore provided comprising hydraulic cement, water, and a hyper-branched polyether surfactant, optionally wherein the hyper-branched polyether surfactant is in the range of about 0.0001% to about 0.02% by weight of cementitious material. The hyper-branched polyether surfactant may comprise a star polymer.

In the preceding embodiments, the hydraulic cement may be at least one of Portland cement, masonry cement, alumina cement, refractory cement, magnesia cement, magnesium phosphate cement, magnesium potassium phosphate cement, calcium aluminate cement, calcium sulfoaluminate cement, oil well cement, blended slag, fly ash or pozzolan cement, natural cement, hydraulic hydrated lime, or mixtures thereof.

In any of the preceding embodiments, the cementitious composition may further comprise an additional surfactant or defoamer, optionally wherein the hyper-branched polyether surfactant and additional surfactant and defoamer together are in the range of about 0.0002% to about 0.05% by weight of cementitious material.

In any of the preceding embodiments, wherein at least one surfactant or defoamer is water insoluble, the cementitious composition may further comprise a stabilizing agent, optionally in the range of about 0.0001% to about 0.1% primary active ingredient by weight of cementitious material. The stabilizing agent may comprise an amine salt solubilizing agent, optionally in the amount of up to about 0.04% by weight of cementitious material.

In any of the preceding embodiments, the cementitious composition may further comprise a dispersant for cementitious compositions, optionally in the range of about 0.01% to about 2% by weight of cementitious material. The dispersant may comprise at least one of lignosulfonates, salts of sulfonated naphthalene sulfonate condensates, salts of sulfonated melamine sulfonate condensates, beta naphthalene sulfonates, sulfonated melamine formaldehyde condensates, naphthalene sulfonate formaldehyde condensate resins, polyaspartates, oligomeric dispersants, polycarboxylate dispersants, polycarboxylate ether dispersants, or mixtures thereof.

In any of the preceding embodiments, the cementitious composition may further comprise a cement admixture or additive comprising at least one of air entrainers, air detrainers, aggregates, pozzolans, set and strength accelerators/enhancers, set retarders, water reducers, corrosion inhibitors, wetting agents, water soluble polymers, rheology modifying agents, water repellents, fibers, dampproofing admixtures, permeability reducers, pumping aids, fungicidal admixtures, germicidal admixtures, insecticide admixtures, finely divided mineral admixtures, pigments, colorants, alkali-reactivity reducer, bonding admixtures, shrinkage reducing admixtures, or mixtures thereof.

In any of the preceding embodiments, the cementitious composition may comprise an additional surfactant or defoamer, and an amine stabilizing agent capable of solubilizing the hyper-branched polyether surfactant and any additional surfactant and/or defoamer in an acidic medium.

An aqueous admixture for cementitious compositions is therefore also provided comprising a hyper-branched polyether surfactant, optionally a dispersant for cementitious compositions, optionally an additional surfactant or defoamer, and optionally a stabilizing agent. The hyper-branched polyether surfactant may comprise a star polymer.

In the preceding embodiments, the stabilizing agent may be an amine stabilizing agent capable of solubilizing the hyper-branched polyether surfactant, and any additional surfactant and/or defoamer in an acidic medium.

An admixture for cementitious compositions is therefore also provided comprising a hyper-branched polyether surfactant, a dispersant for cementitious compositions, optionally an additional surfactant or defoamer, and optionally a stabilizing agent. The dispersant may be in the range of greater than 0 to about 99%, the hyper-branched polyether surfactant may be in the range of about 0.1% to about 10%, the additional surfactant or defoamer may be in the range of 0 to about 10%, and the stabilizing agent may be in the range of 0 to about 10%. In the preceding embodiments, the hyper-branched polyether surfactant may comprise a star polymer.

In any of the preceding embodiments, the dispersant may comprise a polycarboxylate dispersant, a polycarboxylate ether dispersant, or mixtures thereof.

A method of making a cementitious composition is therefore provided comprising mixing cementitious material, water, a hyper-branched polyether surfactant, a dispersant for cementitious compositions, optionally an additional surfactant or defoamer, and optionally a stabilizing agent. The hyperbranched polyether surfactant may comprise a star polymer.

In the preceding embodiments, the hyper-branched polyether surfactant, the dispersant, and the optional additional surfactant or defoamer and/or stabilizing agent, if present, may be added as one solution to the cementitious material.

It will be understood that the embodiments described herein are merely exemplary, and that one skilled in the art may make variations and modifications. Further, all embodiments disclosed are not necessarily in the alternative, as various embodiments may be combined to provide the desired result.

We claim:

1. A cementitious composition comprising hydraulic cement, water, and a hyper-branched polyether surfactant, optionally wherein the hyper-branched polyether surfactant is in the range of about 0.0001% to about 0.02% by weight of cementitious material;

wherein the hyper-branched polyether surfactant comprises a compound or a mixture of compounds which are reaction products of components comprising:

at least one compound a) of formula I:

$$R^1(X)_3 \quad (I)$$

wherein each X group is a halogen atom or one X group is a halogen atom and two X groups represent an epoxy oxygen atom, which is attached to two adjacent carbon atoms in the $R^1$ group to form an epoxy group, and $R^1$ is an alkanetriyl group containing from 3 to 10 carbon atoms; and at least one compound b) of formula IIa:

$$R^2(OA)nY \quad (IIa)$$

wherein $R^2$ is an organic group containing from 1 to 36 carbon atoms, n is a number of from 0 to 200, Y is —OH, —NHR' wherein R' is hydrogen or a $C_1$-$C_4$ alkyl group, and each OA group is independently an ethyleneoxy, 1,2-propyleneoxy, or 1,2-butyleneoxy group, provided that when Y is an amine group, n is at least 1; or of formula IIb:

$$R^2Z(AO)nY^1 \quad (IIb)$$

wherein $R^2$ is hydrogen or an organic group containing from 1 to 36 carbon atoms, Z is —O—, or —$NR^4$—, where $R^4$ is hydrogen or a $C_{1-18}$ alkyl group, each OA group is independently an ethyleneoxy, 1,2-propyleneoxy, or 1,2-butyleneoxy group, n is a number of from 0 to 200, and $Y^1$ is H, or $Y^1$ is mercapto, amino, or $C_{1-6}$ alkylamino in place of a terminal —OH group in which case n is at least 1.

2. The cementitious composition of claim 1, wherein the hyper-branched polyether surfactant comprises a star polymer.

3. The cementitious composition of claim 1, wherein the hydraulic cement comprises at least one of Portland cement, masonry cement, alumina cement, refractory cement, magnesia cement, magnesium phosphate cement, magnesium potassium phosphate cement, calcium aluminate cement, calcium sulfoaluminate cement, oil well cement, blended slag, fly ash or pozzolan cement, natural cement, hydraulic hydrated lime, or mixtures thereof.

4. The cementitious composition of claim 1, further comprising an additional surfactant or defoamer, optionally wherein the hyper-branched polyether surfactant and additional surfactant and defoamer together are in the range of about 0.0002% to about 0.05% by weight of cementitious material.

5. The cementitious composition of claim 4, wherein at least one surfactant or defoamer is water insoluble, further comprising a stabilizing agent, optionally in the range of about 0.0001% to about 0.1% primary active ingredient by weight of cementitious material.

6. The cementitious composition of claim 5, wherein the stabilizing agent comprises an amine salt solubilizing agent, optionally in the amount of up to about 0.04% by weight of cementitious material.

7. The cementitious composition of claim 1, further comprising a dispersant for cementitious compositions, optionally in the range of about 0.01% to about 2% by weight of cementitious material.

8. The cementitious composition of claim 7, wherein the dispersant comprises at least one of lignosulfonates, salts of sulfonated naphthalene sulfonate condensates, salts of sulfonated melamine sulfonate condensates, beta naphthalene sulfonates, sulfonated melamine formaldehyde condensates, naphthalene sulfonate formaldehyde condensate resins, polyaspartates, oligomeric dispersants, polycarboxylate dispersants, polycarboxylate ether dispersants, or mixtures thereof.

9. The cementitious composition of claim 1, further comprising a cement admixture or additive comprising at least one of air entrainers, air detrainers, aggregates, pozzolans, set and strength accelerators/enhancers, set retarders, water reducers, corrosion inhibitors, wetting agents, water soluble polymers, rheology modifying agents, water repellents, fibers, dampproofing admixtures, permeability reducers, pumping aids, fungicidal admixtures, germicidal admixtures, insecticide admixtures, finely divided mineral admixtures, pigments, colorants, alkali-reactivity reducer, bonding admixtures, shrinkage reducing admixtures, or mixtures thereof.

10. The cementitious composition of claim 1 comprising an additional surfactant or defoamer, and an amine stabilizing agent capable of solubilizing the hyper-branched polyether surfactant and any additional surfactant and/or defoamer in an acidic medium.

11. An aqueous admixture for cementitious compositions comprising a hyper-branched polyether surfactant, optionally a dispersant for cementitious compositions, optionally an additional surfactant or defoamer, and optionally a stabilizing agent;

wherein the hyper-branched polyether surfactant comprises a compound or a mixture of compounds which are reaction products of components comprising:

at least one compound a) of formula I:

$$R^1(X)_3 \quad (I)$$

wherein each X group is a halogen atom or one X group is a halogen atom and two X groups represent an epoxy oxygen atom, which is attached to two adjacent carbon atoms in the $R^1$ group to form an epoxy group, and $R^1$ is an alkanetriyl group containing from 3 to 10 carbon atoms; and at least one compound b) of formula IIa:

$$R^2(OA)nY \quad (IIa)$$

wherein $R^2$ is an organic group containing from 1 to 36 carbon atoms, n is a number of from 0 to 200, Y is —OH, —NHR' wherein R' is hydrogen or a $C_1$-$C_4$ alkyl group, and each OA group is independently an ethyleneoxy, 1,2-propyleneoxy, or 1,2-butyleneoxy group, provided that when Y is an amine group, n is at least 1; or of formula IIb:

$$R^2Z(AO)nY^1 \quad (IIb)$$

wherein $R^2$ is hydrogen or an organic group containing from 1 to 36 carbon atoms, Z is —O—, or —$NR^4$—, where $R^4$ is hydrogen or a $C_{1-18}$ alkyl group, each OA group is independently an ethyleneoxy, 1,2-propyleneoxy, or 1,2-butyleneoxy group, n is a number of from 0 to 200, and $Y^1$ is H, or Y' is mercapto, amino, or $C_{1-6}$ alkylamino in place of a terminal —OH group in which case n is at least 1.

12. The aqueous admixture of claim 11 wherein the hyper-branched polyether surfactant comprises a star polymer.

13. The aqueous admixture of claim 11, wherein the stabilizing agent is an amine stabilizing agent capable of solubilizing the hyper-branched polyether surfactant, and any additional surfactant and/or defoamer in an acidic medium.

14. An admixture for cementitious compositions comprising a hyper-branched polyether surfactant, a dispersant for cementitious compositions, optionally an additional surfactant or defoamer, and optionally a stabilizing agent;
wherein the hyper-branched polyether surfactant comprises a compound or a mixture of compounds which are reaction products of components comprising:
at least one compound a) of formula I:

$$R^1(X)_3 \qquad (I)$$

wherein each X group is a halogen atom or one X group is a halogen atom and two X groups represent an epoxy oxygen atom, which is attached to two adjacent carbon atoms in the $R^1$ group to form an epoxy group, and $R^1$ is an alkanetriyl group containing from 3 to 10 carbon atoms; and
at least one compound b) of formula IIa:

$$R^2(OA)nY \qquad (IIa)$$

wherein $R^2$ is an organic group containing from 1 to 36 carbon atoms, n is a number of from 0 to 200, Y is —OH, —NHR' wherein R' is hydrogen or a $C_1$-$C_4$ alkyl group, and each OA group is independently an ethyleneoxy, 1,2-propyleneoxy, or 1,2-butyleneoxy group, provided that when Y is an amine group, n is at least 1; or
of formula IIb:

$$R^2Z(AO)nY^1 \qquad (IIb)$$

wherein $R^2$ is hydrogen or an organic group containing from 1 to 36 carbon atoms, Z is —O—, or —$NR^4$—, where $R^4$ is hydrogen or a $C_{1-18}$ alkyl group, each OA group is independently an ethyleneoxy, 1,2-propyleneoxy, or 1,2-butyleneoxy group, n is a number of from 0 to 200, and $Y^1$ is H, or $Y^1$ is mercapto, amino, or $C_{1-6}$ alkylamino in place of a terminal —OH group in which case n is at least 1.

15. The admixture of claim 14, wherein, based on dry weight of solids, the dispersant is in the range of greater than 0 to about 99% the hyper-branched polyether surfactant is in the range of about 0.1% to about 10%, the additional surfactant or defoamer is in the range of 0 to about 10%, and the stabilizing agent is in the range of 0 to about 10%.

16. The admixture of claim 14, wherein the hyperbranched polyether surfactant comprises a star polymer.

17. The admixture of claim 14, wherein the dispersant comprises a polycarboxylate dispersant, a polycarboxylate ether dispersant, or mixtures thereof.

18. A method of making a cementitious composition comprising mixing cementitious material, water, a hyper-branched polyether surfactant, a dispersant for cementitious compositions, optionally an additional surfactant or defoamer, and optionally a stabilizing agent;
wherein the hyper-branched polyether surfactant comprises a compound or a mixture of compounds which are reaction products of components comprising:
at least one compound a) of formula I:

$$R^1(X)_3 \qquad (I)$$

wherein each X group is a halogen atom or one X group is a halogen atom and two X groups represent an epoxy oxygen atom, which is attached to two adjacent carbon atoms in the $R^1$ group to form an epoxy group, and $R^1$ is an alkanetriyl group containing from 3 to 10 carbon atoms; and
at least one compound b) of formula IIa:

$$R^2(OA)nY \qquad (IIa)$$

wherein $R^2$ is an organic group containing from 1 to 36 carbon atoms, n is a number of from 0 to 200, Y is —OH, —NHR' wherein R' is hydrogen or a $C_1$-$C_4$ alkyl group, and each OA group is independently an ethyleneoxy, 1,2-propyleneoxy, or 1,2-butyleneoxy group, provided that when Y is an amine group, n is at least 1; or
of formula IIb:

$$R^2Z(AO)nY^1 \qquad (IIb)$$

wherein $R^2$ is hydrogen or an organic group containing from 1 to 36 carbon atoms, Z is —O—, or —$NR^4$—, where $R^4$ is hydrogen or a $C_{1-18}$ alkyl group, each OA group is independently an ethyleneoxy, 1,2-propyleneoxy, or 1,2-butyleneoxy group, n is a number of from 0 to 200, and $Y^1$ is H, or $Y^1$ is mercapto, amino, or $C_{1-6}$ alkylamino in place of a terminal —OH group in which case n is at least 1.

19. The method of claim 18, wherein the hyper-branched polyether surfactant, the dispersant, and the optional additional surfactant or defoamer and/or stabilizing agent, if present, are added as one solution to the cementitious material.

20. The method of claim 18, wherein the hyperbranched polyether surfactant comprises a star polymer.

21. The method of claim 18 wherein the hyper-branched polyether surfactant is a star polymer, the dispersant comprises a polycarboxylate ether dispersant, and the stabilizing agent is present, optionally as an amine surfactant stabilizing agent.

22. The aqueous admixture of claim 14 comprising the hyper-branched polyether surfactant, a polycarboxylate ether dispersant, and a stabilizing agent, optionally an amine surfactant stabilizing agent.

23. The cementitious composition of claim 1 comprising the hyper-branched polyether surfactant, a polycarboxylate ether dispersant, and a stabilizing agent, optionally an amine surfactant stabilizing agent.

* * * * *